United States Patent [19]
Drabek

[11] 3,922,852
[45] Dec. 2, 1975

[54] VARIABLE PITCH FAN FOR GAS TURBINE ENGINE

[75] Inventor: Stephen Drabek, Boxford, Mass.

[73] Assignee: General Electric Company, Lynn, Mass.

[22] Filed: Oct. 17, 1973

[21] Appl. No.: 407,222

[52] U.S. Cl............... 60/226 R; 415/130; 416/154; 416/162; 416/165; 416/167; 416/168
[51] Int. Cl.².... F02C 3/06; F02K 3/06; F01D 7/00; B63H 3/04
[58] Field of Search.......... 60/226 R, 262; 415/130; 416/162, 164–168, 153, 154

[56] References Cited
UNITED STATES PATENTS

| | | | |
|---|---|---|---|
| 1,942,100 | 1/1934 | Houston | 416/162 |
| 2,440,046 | 4/1948 | Hautier | 416/162 |
| 3,396,905 | 8/1968 | Johnson | 60/226 R |
| 3,528,752 | 9/1970 | Davies et al. | 415/130 |
| 3,549,272 | 12/1970 | Bauger et al. | 416/166 |

FOREIGN PATENTS OR APPLICATIONS

| | | | |
|---|---|---|---|
| 544,419 | 9/1922 | France | 416/166 |
| 115,712 | 11/1945 | Sweden | 416/166 |

*Primary Examiner*—C. J. Husar
*Assistant Examiner*—Robert E. Garrett
*Attorney, Agent, or Firm*—James W. Johnson, Jr.; Derek P. Lawrence

[57] ABSTRACT

A variable pitch fan together with actuation apparatus are provided for a gas turbine engine of the bypass type. The actuation apparatus includes at least one linear actuator which remains in fixed connection relative to the engine static structure and interconnects to a helical cam means on board the fan rotor through a preloaded thrust bearing. The linear movement of the actuator is converted into angular movement by the helical cam means whereby the angular movement can be applied to all the fan blades to simultaneously vary their pitch.

11 Claims, 3 Drawing Figures

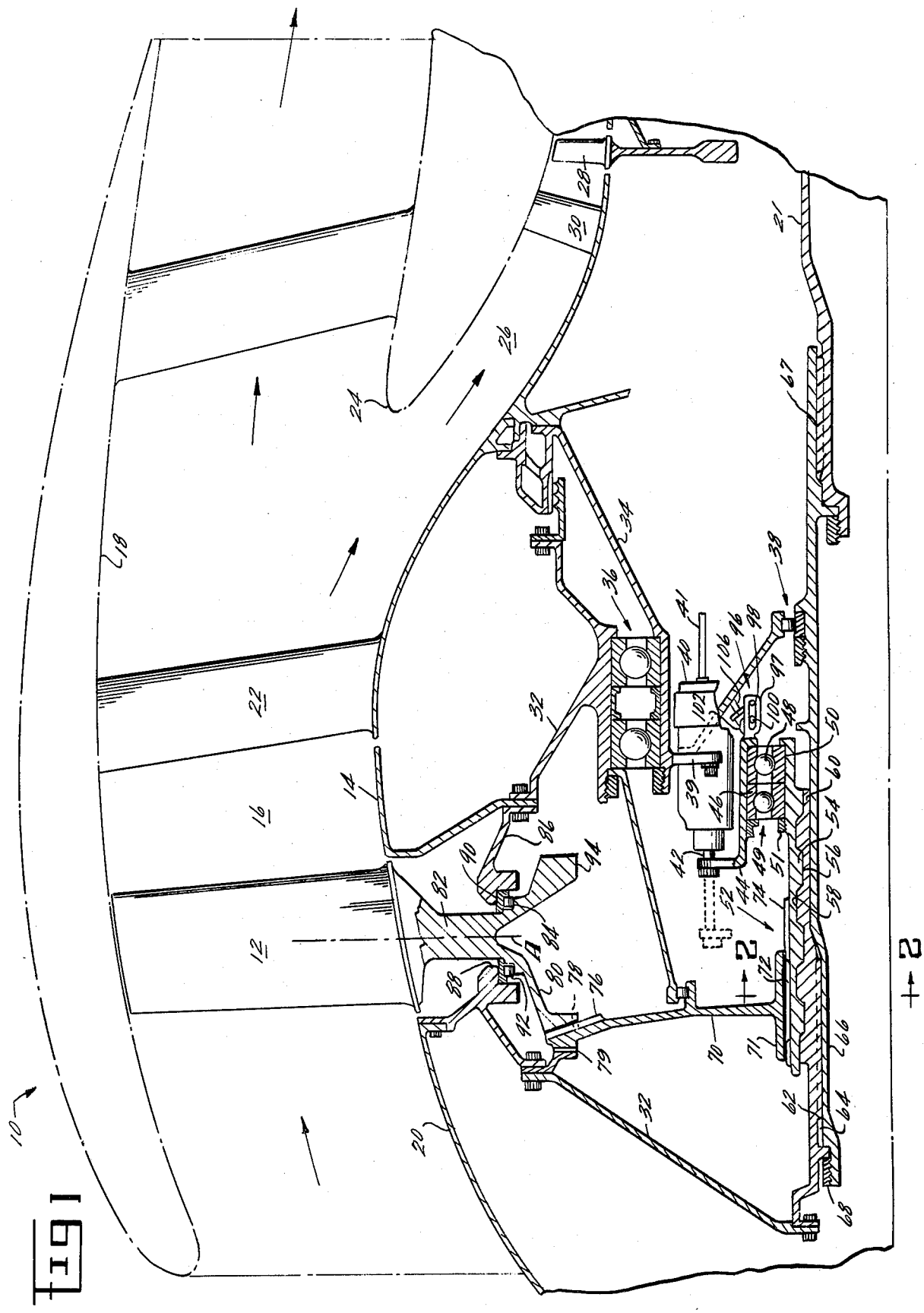

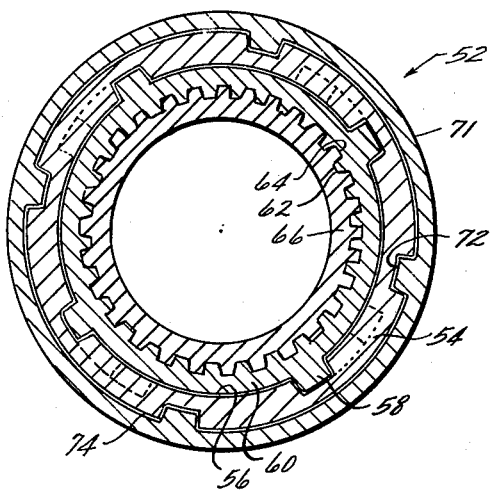
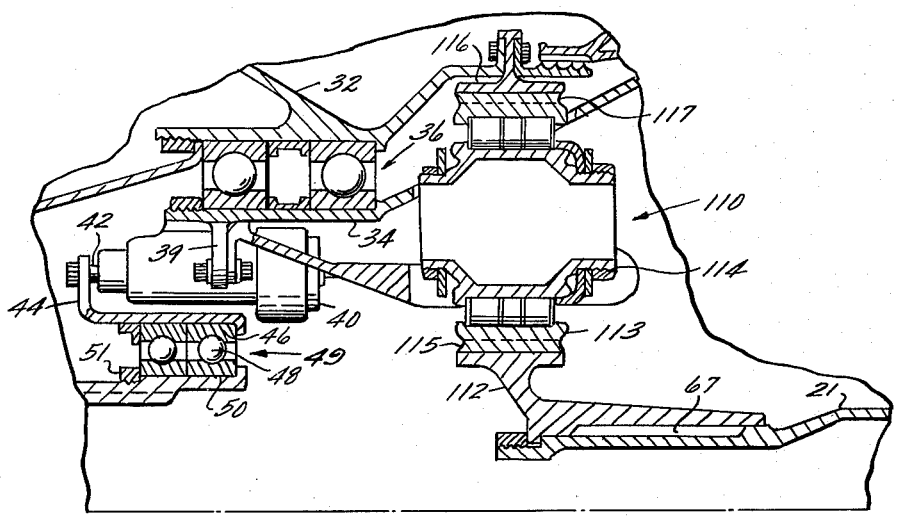

VARIABLE PITCH FAN FOR GAS TURBINE ENGINE

BACKGROUND OF THE INVENTION

This invention relates to a variable pitch fan for a gas turbine engine and, more particularly, to a variable pitch fan and its associated actuation apparatus for a gas turbine engine of the bypass type having a bypass duct.

The new family of high bypass, large diameter, turbofan engines recently introduced into airline service have proved to be an economical and convenient means of propulsion for today's wide bodied aircraft which cruise subsonically. The high bypass engines have also demonstrated noise levels which are significantly lower than those of previous generation engines due to the reduced jet velocities of the airflow pressurized by the fan while thrust levels have been increased as a direct result of the increased mass airflow through the fan. Even further increases in performance efficiency could be obtained if the fan speed could be varied to meet different engine operating requirements as dictated by the flight mission.

One means of varying the fan speed of a bypass turbofan engine without changing the rotational speed of the core engine is through the use of variable pitch fan blading. Such blading may be varied to cater to varying flight conditions and may even be varied to reverse pitch for complete thrust reversal after landing. However, in spite of these advantages, the use of variable pitch fan blading has not proved entirely satisfactory due to the high centrifugal forces under which the variable pitch blading must be actuated.

Most conventional systems for varying fan blade pitch utilize actuators which are carried directly by the rotating fan structure. As a result, the rotating components must be braced and enlarged in order to sustain this additional centrifugal loading, thereby resulting in an increase in the weight of the engine and a decrease in its performance and efficiency. In addition, control signals to the actuator must be transferred from the static engine frame structure to the rotating fan structure which may involve the use of slip rings, rotating seals, or other complex structure. Variable pitch fans generally require a feedback system connected to the controls in the aircraft cockpit in order that the exact pitch of the fan blades may be determined at all times. This is of particular importance for detecting a failure in the actuation system as may occur from a hydraulic leak of other malfunction. Locating the variable pitch actuation mechanism directly on the rotating fan assembly, however, necessitates the use of a complex feedback system in order to transfer the signals from a rotating reference to a stationary reference. Also, it is necessary that some safety means be provided to insure that the fan blades cannot be rotated into reverse pitch during flight without some specific control action. In aircraft other than military, reverse pitch should generally be attained only after the aircraft has landed and it becomes necessary to reverse thrust.

Therefore, it is a primary object of this invention to provide a simplified variable pitch fan and actuation apparatus for a gas turbine engine of the bypass type wherein the actuators for the variable pitch blading are located on the static frame structure and do not undergo centrifugal loading thus permitting the use of simple and conventional actuators.

It is also an object of this invention to provide a simplified variable pitch fan and actuation apparatus for a gas turbine engine wherein a direct mechanical linkage between the variable pitch fan blades and the static engine structure varies the blade pitch through simple pronounced mechanical motions thus eliminating the need for a complex feedback system located on board the fan rotor in order to verify the exact pitch of the fan blades.

It is another object of this invention to provide a simplified variable pitch fan and actuator apparatus for a gas turbine engine wherein stop limits are provided during normal flight to positively preclude actuation of the fan blades into reverse pitch such that only after a specific control action are the stop limits removed for actuation of the fan blades into reverse pitch.

SUMMARY OF THE INVENTION

These and other objects and advantages will become clearly understood from the following detailed description and drawings, all of which are intended to be representative of, rather than in any way limiting on, the scope of invention. A variable pitch fan and actuation apparatus are provided for a gas turbine engine of the bypass type having a bypass duct. The fan and actuation apparatus include a fan frame structure which is disposed for rotation about a static frame structure. A plurality of circumferentially spaced apart variable pitch fan blades extend into the bypass duct and are disposed about the fan frame structure for rotation therewith. At least one linear actuator is fixedly connected to the static frame structure and includes an actuator piston drive rod connecting to the static bearing ring of a thrust bearing. Helical cam means are disposed for rotation with the fan frame structure and interconnect with the rotational bearing ring of the thrust bearing, thereby converting the linear movement of the actuator into angular movement about the fan center axis. Fan blade pitch varying means simultaneously impart the change in angular position of the helical cam means to the plurality of variable pitch fan blades, thereby varying the pitch of the fan blades in accordance with different engine operating requirements.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a partial cross-sectional view of the upstream portion of a bypass type gas turbine engine embodying the variable pitch fan and actuation apparatus of this invention.

FIG. 2 is a cross-sectional view along the line 2—2 of FIG. 1.

FIG. 3 is a partial cross-sectional view of the upstream portion of a bypass type gas turbine engine embodying an alternate embodiment of the variable pitch fan and actuation apparatus of this invention.

DESCRIPTION OF THE PREFERRED EMBODIMENT

Referring to FIG. 1, there is shown an arrangement for a variable pitch fan 10 which is suitable for attachment to the forward end of a gas turbine engine. The fan 10 includes a plurality of circumferentially spaced apart variable pitch fan blades 12 disposed about an inner fairing 14 which extends forwardly of the variable pitch blades 12 and defines an upstream spinner 20. A static bypass duct 16 is provided between the inner fairing 14 and an outer spaced apart cowling 18.

The gas turbine engine may be of a conventional type having a compresssor section, a combustion section (not shown), and a turbine section (not shown) arranged in serial flow relation on either a single shaft or a dual shaft, the forward end of which is shown generally at 21. The outline of only the forward end of the compressor is shown at 24 and defines a compressor inlet 26 communicating with a plurality of rotatable compressor blades 28 interspaced between a plurality of stator vanes 30 which may be of the variable type. The compressor is thus charged by the fan 10 and the variation of blade pitch not only varies the fan speed but, in effect, provides a variable first compressor stage. A plurality of circumferentially spaced apart stator vanes 22 may be mounted between the inner fan fairing 14 and the outer cowling 18, aft of the variable pitch fan blading 12 and ahead of the compressor inlet 26. The pitch of the fan blading 12 may be varied to reverse the airflow along the duct 16 and thus provide reverse thrust to aerodynamically brake a landing aircraft.

The variable pitch fan blades 12, together with the inner fairing 14 and the spinner 20 are all interconnected for rotation about the engine axis by a rotating frame structure shown generally at 32. Frame structure 32 fixedly connects to the forward end of the fan turbine shaft 21 through an interconnecting coupling, the details of which will become more obvious from the following discussion. Frame structure 32 is also disposed for rotation about a static frame structure 34 by means of a pair of axially spaced apart rows of ball bearings 36, together with a row of roller bearings 38.

At least one or more linear actuators 40 are disposed in spaced apart relation about the static frame structure 34 and interconnected thereto by means of hanging brackets 39. Linear actuators 40 may be of the well known hydraulic type wherein hydraulic fluid is supplied under pressure to the actuators 40 through a plurality of conduits 41 from a control source of hydraulic fluid (not shown). Alternatively, the linear actuators 40 could be of the screw jack type driven by a rotating motion from a hydraulic pneumatic or electric motor (not shown). The control for either hydraulic or screw jack actuators would be similar to that used to control the variable area of a jet exhaust nozzle and thus would be well known to a person of ordinary skill in the art.

Each linear actuator 40 includes a forwardly extending actuator piston drive rod 42 which interconnects to an outer bearing ring or race 46 through a folded bracket 44. The outer bearing ring 46 in cooperation with an inner bearing ring or race 50 preloads two axially spaced apart rows of ball bearings 48 which together function as a zero backlash thrust bearing 49 for rotatably maintaining a three part spline assembly 52.

The three part spline assembly 52 includes an intermediate tubular portion 54 projecting forwardly in a sleeve-like manner from fixed connection to the inner bearing race 50 which is slid over the intermediate tubular portion 54 and locked thereto by means of a locking nut 51. The intermediate tubular portion 54 is provided on its inner surface with helical teeth 56 which engage the spaces between helical teeth 58 provided around the outer surface of an inner tubular portion 60 of the three part spline assembly 52. This arrangement of helical teeth 56 and 58 provides a helical cam mechanism whereby linear movement of the actuator 40 is converted to angular and translational movement of the intermediate tubular portion 54 about the fan center axis. The inner cylindrical surface of the tubular portion 60 is provided with straight teeth or splines 62 which engage the straight teeth or splines 64 on the outer cylindrical surface of a tubular shaft extension 66, the downstream end of which may be splined at 67 for connection to the upstream end of the fan turbine shaft 21. The inner tubular portion 60 may be locked against axial translation along the tubular shaft extension 66 by means of a locknut 68.

A plurality of circumferentially spaced apart straight teeth or splines 74 are provided around the forward end of the outer cylindrical surface of the intermediate tubular portion 54 and engage a plurality of circumferentially spaced apart straight teeth or splines 72 formed on the inner cylindrical surface of an outer tubular portion 71. The outer tubular portion 71 changes angularly with the intermediate tubular portion 54 while the axial translation of the intermediate tubular portion 54 is not imparted to the outer tubular portion 71. Extending radially outward from the outer tubular portion 71 and formed integral therewith is a unison bevel gear 70, the outer rim of which has a plurality of circumferentially spaced apart teeth 76 formed therearound. The teeth 76 around the rim of the unison bevel gear 70 engage teeth 78 which extend from a plurality of circumferentially spaced apart sector gears 80, each one of which is connected to a respective root portion 82 from a variable pitch fan blade 12. The axial loading between the outer rim of the unison bevel gear 70 and the individually spaced apart sector gears 80 may be accommodated by a simple dry lubricated thrust bearing 79 sandwiched between the forward face of the unison bevel gear 70 and the rotating frame structure 32.

The root portion 82 of each variable pitch fan blade 12 is thickened at its inner radial end to form a circumferential flange 84 which engages a plurality of circumferentially spaced apart antifriction bearings 92. The rotating frame structure 32 includes a reinforced cylindrical support section 86 which has a plurality of circumferentially spaced apart radial bores 88 therethrough, each one of which receives a root portion 82 from a variable pitch fan blade 12. The radial bores 88 each include an overlapping circumferential flange portion 90 aligned in substantially opposing relation to a corresponding circumferential flange 84 so as to maintain the antifriction bearings 92 therebetween. In this manner, each blade 12 is maintained for rotation about its center axis, A, at the high centrifugal load forces which are incurred during high speed operation of the fan 10.

During fan operation, the individual fan blades 12, due to the high centrifugal forces operating thereon, incur a high dynamic turning moment which operates to rotate the blades about their longitudinal center axis, A, such that the major surfaces of each blade tend to become aligned normal to the center axis of fan rotation and thus block the airflow through the static bypass duct 16. For additional information regarding the inherent turning moments of variable pitch fan blades, please refer to U.S. Pat. No. 2,844,303 dated July 22, 1958. As is well known in the art, the inherent turning moments incurred by variable pitch fan blades may be countered by opposite turning moments induced by counterweights which are attached to the blade roots and which extend in directions normal to the blade chord. The individual sector gears 80 have an extended radius so as to provide one portion of a dynamic turning moment balance counterweight with the other portion of the balance counterweight provided by an extension 94 from the blade root 82. The mass of the sector gear 80 and the integral extension 94 are spaced apart along an axis normal to the chord of blade 12 so as to provide a dynamic turning moment approximately equal to the inherent dynamic turning moment of the blade 12, thereby assuring that each blade 12 remains operative, should, for some reason, the actuating system fail. Otherwise, as previously mentioned, the inherent turning moment of the fan blades 12 would operate to close the blades 12 and block airflow to the compressor inlet 26, resulting in a potential shutdown of the gas turbine engine.

During engine and fan operation, control signals are provided to the linear actuators 40 which, in turn, translate the piston drive rods 42 and their attached brackets 44, together with the outer bearing race 46. This linear translation is, in turn, imparted to the rotating intermediate tubular portion 54 which follows the path of the helical teeth 56, 58 and thereby converts the linear movement into an angular movement about the fan center axis. The intermediate tubular portion 54 translates axially relative to the outer tubular portion 71 such that only the angular movement is imparted to the unison bevel gear 70. This change in angular position of the unison bevel gear 70 is, in turn, simultaneously imparted to all the spaced apart sector gears 80 through the inter-engaging teeth 76, 78. Rotation of each sector gear about the fan blade center axis A operates to simultaneously vary the pitch of all the fan blades.

In this manner, the fan speed may be varied to meet the different engine operating requirements as the flight mission dictates. It will be appreciated that a direct mechanical connection is provided between the actuator piston drive rods 42 and the variable pitch blades 12 such that the position of the actuator piston drive rod 42 may be detected and correlated as a true indication of the actual blade pitch, thereby eliminating the need for a complex feedback system. It will also be appreciated that load pads of woven Teflon fibre may be distributed both axially and circumferentially about the splined and helical grooves of the three part spline assembly 52 in order to facilitate easy translation of the individual components.

The input control signals to the linear actuators 40 through the conduits 41 may become inoperative for one reason or another, such as a hydraulic leak or other control fault, in which case it becomes necessary to provide stop limits upon the normal variation in fan blade pitch so as to prevent the possibility of the fan blades going beyond the desirable range for flight operation. To this end, there is provided an integral extension 97 from the downstream end of the folded bracket 44 wherein the extension 97 has a cam track 98 therein normally engaged by a pin 100 extending from an actuator 102 which is maintained in fixed connection relative to the stationary frame structure 34. The actuator 102 may be controlled by a hydraulic signal received through a conduit 106 which connects to a source of pressurized hydraulic fluid (not shown). During all phases of flight, the pin 100 is engaged within the cam track 98 and provides stop limits beyond which the pitch of the fan blades 12 cannot be varied. Thus, if the linear actuators 40 receive an abnormal signal to extend into the region of reverse pitch during flight the cam track 98 being engaged by the pin 100 will restrict the ultimate linear translation of the folded bracket 44, thus restricting the actual angular shift of the unison bevel gear 70. After touchdown, the actuator 102 may be signaled to retract the pin 100 from the cam track 98, thus permitting the linear actuator 40 to extend and translate the folded bracket 44 into the position correlating with reverse fan pitch.

Referring now to FIG. 3, where like numerals refer to previously described elements, there is shown an alternate arrangement whereby the rotational speed of the fan 10 may be reduced in relation to the rotational speed of the fan turbine shaft 21. For this purpose, there is included a speed reduction gear arrangement 110 comprising an inner spur gear 112 in splined connection to the forward end of the fan turbine shaft 21. The inner spur gear 112 has a plurality of outwardly extending teeth 113 engaged by the outside teeth 115 of a plurality of circumferentially spaced apart planet gears 114 which are rotatably retained relative to the stationary frame member 34. The teeth 115 of the planetary gears 114 engage inwardly extending teeth 117 from an outer ring gear 116 which is fixedly connected to the rotating frame member 32. Thus, an overall reduction in the rotational speed of the fan 10 may be accomplished in an expeditious manner without interfering with the pitch varying mechanism of this invention.

Thus having described preferred embodiments of the invention, though not exhaustive of all possible equivalents, what is desired to be secured by letters patent is claimed below.

What is claimed is:

1. A variable pitch fan and actuation apparatus for a gas turbine engine of the bypass type having a bypass duct and a fan drive shaft, a static frame structure, a fan frame structure mounted in driven engagement with the fan drive shaft for rotation about the static frame structure, a plurality of circumferentially spaced apart variable pitch fan blades extending into the bypass duct and fixedly attached to the fan frame structure for rotation therewith, linear actuator means fixedly connected to the static frame structure, angular actuator means fixedly connected to the fan frame structure for rotating the fan blades in unison about their respective center axes to thereby vary the pitch of the fan blades, means for interconnecting the linear actuator means and the angular actuator means so as to permit relative rotation therebetween, and helical cam means for converting linear movement of the linear actuator means into angular movement of the angular actuator means to thereby permit the pitch of the fan blades to be varied by linear movement of the linear actuator means in accordance with differing engine operating requirements, limit stop means connected to the linear actuator means for restricting the linear movement of the linear actuator means to predefined travel distances in order to provide limit stops beyond which the pitch of the fan blades cannot be varied, inactivating means for inactivating the limit stop means so that the pitch of the fan blades may be fully varied.

2. The variable pitch fan and actuation apparatus of claim 1 further including reduction gear means connected between the fan drive shaft and the fan frame structure for reducing the rotational speed of the fan frame structure relative to the fan drive shaft.

3. The variable pitch fan and actuation apparatus of claim 1 wherein the linear actuator means includes an actuator piston drive rod and the interconnecting means comprises a preloaded thrust bearing having an inner bearing ring fixedly attached to the piston drive rod and an outer bearing ring fixedly attached to the helical cam means.

4. The variable pitch fan and actuation apparatus of claim 3 wherein the helical cam means comprises a three parr spline assembly having an intermediate tubular portion projecting forwardly in a sleevelike manner from fixed connection to the inner bearing ring together with a plurality of helical teeth on its inner surface which engage the spaces between helical teeth provided around the outer surface of an inner tubular portion, means for restraining the inner tubular portion from translation relative to the fan axis and further including a plurality of circumferentially spaced apart straight teeth or splines around the forward end of the outer cylindrical surface of the intermediate tubular portion in engagement with a plurality of circumferentially spaced apart straight teeth or splines formed on the inner cylindrical surface of an outer tubular portion and means for restraining the outer tubular portion from translation relative to the fan axis whereby linear movement of the linear actuator means converts to angular and translational movement of the intermediate tubular portion which simultaneously converts to angular movement of the outer tubular portion.

5. The variable pitch fan and actuation apparatus of claim 4 wherein the angular actuator means includes a unison bevel gear extending radially outward from connection to the outer tubular portion and having a plurality of circumferentially spaced apart teeth formed around the outer rim thereof which engage teeth extending from a plurality of circumferentially spaced apart sector gears each one of which is integrally connected to a respective root portion from a variable pitch fan blade.

6. The variable pitch fan and actuation apparatus of claim 5 wherein the inherent turning moments incurred by the variable pitch fan blades due to the high centrifugal forces operating thereon are countered by opposite turning moments induced by the individual sector gears which have an extended radius so as to provide one portion of a dynamic turning moment balance counterweight with the other portion provided by an integral extension from the blade root wherein the mass of the sector gear and integral extension are spaced apart along an axis normal to the chord of the attached blade so as to provide a dynamic turning moment approximately equal to the inherent dynamic turning moment of the blade.

7. The variable pitch fan and actuation apparatus of claim 5 wherein the root portion of each variable pitch fan blade is attached at its inner radial end to a circumferential flange which engages a plurality of circumferentially spaced apart anti-friction bearings and the rotating frame structure provides a reinforced cylindrical support section which includes a plurality of circumferentially spaced apart radial bores therethrough, each one of which receives a root portion from a variable pitch fan blade and each radial bore includes an overlapping circumferential flange portion aligned in substantially opposing relation to a corresponding circumferential flange from a blade root so as to maintain the anti-friction bearings therebetween thereby maintaining each blade for rotation about its center axis.

8. The variable pitch fan and actuation apparatus of claim 5 wherein the axial loading between the outer rim of the unison bevel gear and the individually spaced apart sector gears is accommodated by a dry lubricated thrust bearing sandwiched between the forward face of the unison bevel gear and the rotating frame structure.

9. The variable pitch fan and actuation apparatus of claim 4 wherein the limit stop means comprises an extension fixedly connected to the actuator piston drive rod, said extension including a cam track therein and the inactivation means comprises a second actuator which is maintained in fixed connection relative to the static frame structure and includes a retractable pin extending therefrom into engagement with the cam track such that during all phases of flight the pin may be actuated into engagement within the cam track to provide stop limits beyond which the pitch of the fan blades 12 cannot be varied and that when the pin is retracted from the cam track the fan blades may be extended into a position correlating with reverse fan pitch.

10. The variable pitch fan and actuation apparatus of claim 4 wherein the gas turbine engine includes a compressor section, a combustion section and a turbine section arranged in serial flow relation downstream of the variable pitch fan and the fan drive shaft extends upstream of the turbine section drivably engaging the fan through a tubular shaft extension, the aft end of which is in splined connection to the forward end of the drive shaft and the outer surface of which is in splined connection to the inner surface of the inner tubular portion.

11. The variable pitch fan and actuation apparatus of claim 2 wherein the reduction gear means comprises an inner spur gear connected for rotation with the fan drive shaft and having a plurality of outwardly extending teeth engaged by the outside teeth of a plurality of circumferentially spaced apart planet gears which are rotatably retained relative to the stationary frame structure wherein the teeth of the planetary gears engage inwardly extending teeth from an outer ring gear which is fixedly connected to the rotating frame structure thereby effecting an overall reduction in the rotational speed of the fan in relation to the fan drive shaft.

* * * * *